US006974002B2

(12) United States Patent
Heideman

(10) Patent No.: US 6,974,002 B2
(45) Date of Patent: Dec. 13, 2005

(54) ADJUSTABLE SHOCK ABSORBER

(75) Inventor: Robert Heideman, Westland, MI (US)

(73) Assignee: Ace Controls, Inc., Farmington Hills, MI (US)

( * ) Notice: Subject to any disclaimer, the term of this patent is extended or adjusted under 35 U.S.C. 154(b) by 0 days.

(21) Appl. No.: 10/393,168

(22) Filed: Mar. 20, 2003

(65) Prior Publication Data

US 2004/0182662 A1    Sep. 23, 2004

(51) Int. Cl.$^7$ ............................................. F16F 9/46
(52) U.S. Cl. ........................................ 188/285; 188/287
(58) Field of Search .............................. 188/285, 287, 188/286, 322.22, 322.15; 16/51, 52, 82; 267/221, 267/226; 213/223

(56) References Cited

U.S. PATENT DOCUMENTS

| | | | |
|---|---|---|---|
| 3,693,767 A * | 9/1972 | Johnson | 188/285 |
| 4,026,533 A | 5/1977 | Hennells | |
| 4,044,865 A * | 8/1977 | Tourunen | 188/287 |
| 4,059,175 A * | 11/1977 | Dressell et al. | 188/285 |
| 4,071,122 A * | 1/1978 | Schupner | 188/285 |
| 4,298,101 A | 11/1981 | Dressell, Jr. et al. | |
| 4,690,255 A | 9/1987 | Heideman | |
| 4,702,355 A * | 10/1987 | Heideman | 188/285 |
| 5,050,712 A * | 9/1991 | Heideman | 188/287 |
| 5,159,997 A * | 11/1992 | Heideman et al. | 188/282.1 |
| 5,598,904 A | 2/1997 | Spyche, Jr. | |
| 2004/0182662 A1 * | 9/2004 | Heideman | 188/285 |

FOREIGN PATENT DOCUMENTS

| | | |
|---|---|---|
| JP | 55020936 | 2/1980 |
| JP | 59-147133 * | 8/1984 |
| JP | 5914733 | 8/1984 |
| JP | 1-220733 * | 9/1989 |
| JP | 01220733 | 9/1989 |
| WO | WO 2004/085872 A1 * | 10/2004 |

* cited by examiner

Primary Examiner—Douglas C. Butler
(74) Attorney, Agent, or Firm—Price, Heneveld, Cooper, DeWitt & Litton, LLP

(57) ABSTRACT

An adjustable shock absorber for applying a force to a moving member so as to decelerate the member. The present invention provides a cylindrical outer tube having a plurality of circular, angular grooves formed in the inner surface of the tube. A cylindrical inner tube is rotatably disposed within the outer tube. A piston is slidably disposed within the inner tube and is engageable with the moving member. The piston moves between a compressed position and an extended position. The inner tube has a plurality of apertures extending therethrough and fluidly communicatable with the grooves in the outer tube. A screw thread is formed in the outer surface of the inner tube and is fluidly communicatable with the grooves in the outer tube. The inner tube and the outer tube rotate with respect to each other to adjust the level of fluid communication between the rearward end and the forward end of the shock absorber to adjust the level of force applied to the moving member. The use of the screw thread on the inner tube increases the efficiency of the manufacturing process as opposed to conventional processes.

23 Claims, 4 Drawing Sheets

ADJUSTABLE SHOCK ABSORBER

FIELD OF THE INVENTION

The present invention relates to an adjustable shock absorber, and more particularly, an adjustable shock absorber having a helical fluid path.

BACKGROUND OF THE INVENTION

Linear decelerators and shock absorbers are commonly used to maintain or reduce the velocity or acceleration of an object or apparatus. These applications are typically utilized to control the speed or acceleration of an object so that the object may be more easily controlled or manipulated.

Linear decelerators and shock absorbers, which force fluid through a restricted orifice to convert the kinetic energy of the moving part into an increase of thermal energy of the fluid, are commonly used on machines. The smoothest deceleration of the moving parts is obtained by shock absorbers which offer a constant resistive force to the motion over the total length of the deceleration.

One class of such devices employs a piston connected to the moving object and movable within a metering cylinder or tube having a closed end. A series of spaced orifices are formed along the length of the tube wall, and the tube is supported within a housing filled with fluid. As the piston is forced into the tube by the motion of the moving part, the fluid is forced through the orifices, and the kinetic energy of the part is converted into thermal energy of the fluid. As the piston moves down the metering tube, it successfully closes off the orifices so that the force imposed on the load is maintained relatively constant, thereby resulting in a substantially linear deceleration of the moving part.

The force imparted on the object is a function of the effective configuration of the fluid orifices. Linear decelerators and shock absorbers of this class have been designed, wherein an outer tube or sleeve fits over the inner metering tube and is provided with metering means which coact with the metering orifices and inner tube to vary the resistive force in response to relative movement between the tubes, thereby allowing the linear decelerator to be selectively adjusted or used with parts having varying weights and kinetic energy.

Due to the intricacies of the orifices and fluid paths that must be created within such linear decelerators and shock absorbers, manufacturing such parts can be rather difficult and expensive. Typically, such parts are heat treated, ground, and commonly milled to provide the necessary configuration of the parts. Flats are commonly milled on cylindrical parts to allow for the flow of fluids between mating cylinders. Milling such flats during the last machining operation of the machining process may create raised burrs on precision ground parts. These burrs must be removed by a secondary operation, thereby creating added inefficiencies and inaccuracies in the manufacturing process. If the burrs are not removed, the burrs may become dislodged during the assembly and/or operation of the shock absorber. Such burrs may affect the relative sliding or rotation of adjacent parts, or the burrs may clog orifices, thereby affecting the performance of the shock absorber.

It would be desirable to design an adjustable shock absorber, whereby the milling of flats on substantially cylindrical parts was eliminated or minimized in order to increase the efficiency of the manufacturing of such parts.

SUMMARY OF THE INVENTION

The present invention provides an adjustable shock absorber for applying a force to a moving member so as to decelerate the member. The adjustable shock absorber provides an outer tube having a substantially cylindrical configuration and a plurality of circular, angular grooves formed in an inner surface of the outer tube. An inner, substantially cylindrical tube is rotatably disposed within the outer tube, and the inner tube has a closed rearward end and an open forward end. A piston has a rearward end slidably disposed within the inner tube and a forward end that extends outward from the forward end of the inner tube. The piston is engageable with the moving member and is movable between a compressed position, wherein the piston is furthest toward said rearward end of said inner tube, and an extended position, wherein the piston is furthest toward the forward end of the inner tube. The inner tube has a plurality of apertures extending therethrough and fluidly communicatable with the grooves in the outer tube. A screw thread is formed in the outer surface of the inner tube and is fluidly communicatable with the grooves in the outer tube. The inner tube and the outer tube rotate with respect to each other to adjust the level of fluid communication between the rearward end and the forward end of the shock absorber. By adjusting the flow of fluid between the apertures in the inner tube and the grooves in the outer tube and between the grooves in the outer tube and the screw thread of the inner tube, the level of force applied to the moving member may be adjusted.

The piston of the adjustable shock absorber of the present invention is further defined by a piston rod having a rearward end slidably disposed within the inner tube and a forward end extending outward from the forward end of the shock absorber. A piston head circumscribes the rearward end of the piston rod, wherein a gap exists between the piston rod and the piston head. The piston head is movable between the compressed position, wherein fluid flow is prohibited from passing between the piston head and the piston rod, and an extended position, wherein fluid flow is open between the piston head and the piston rod. A piston head retainer is connected to the rearward end of the piston rod and has at least one aperture extending therethrough. The piston head is captured by the piston head retainer and a shoulder formed on the piston rod. The piston head abuts the shoulder on the piston rod in the contracting position to prohibit fluid flow between the piston head and the piston rod and abuts the piston head retainer in the extending position to allow fluid flow between the piston head and the piston rod and through the aperture in the piston head retainer.

The screw thread formed on the outer surface of the inner tube may have a male portion and a female portion, wherein the apertures in the inner tube are located in the male portion of the screw thread on the outer diameter of the inner tube. The male portion of the screw thread slidably engages the inner diameter of the outer tube. A passageway in the forward end of the inner tube communicates with the screw thread for communicating fluid flow between the rearward end and the forward end of the shock absorber. The level of force applied to the moving member is adjustable between a maximum force and a minimum force in response to 180° relative rotation between the outer tube and the inner tube.

BRIEF DESCRIPTION OF THE DRAWINGS

The description herein makes reference to the accompanying drawings, wherein like reference numerals refer to like parts throughout several views, wherein.

DETAILED DESCRIPTION OF THE PRESENT INVENTION

Figure 1:
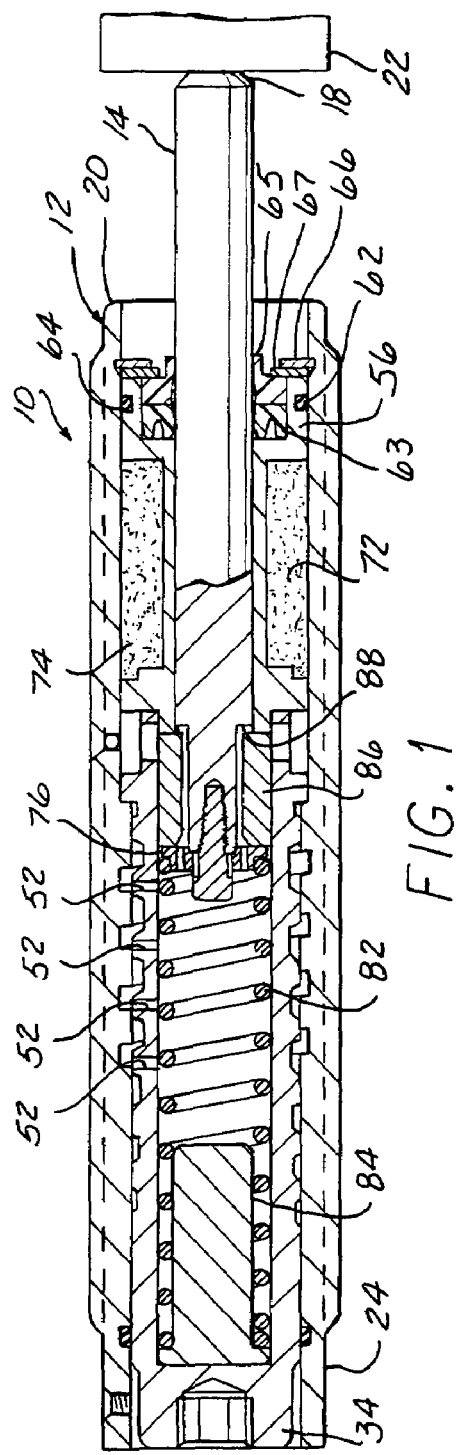
FIG. 1 is a sectional view showing the adjustable shock absorber of the present invention in the extended position.

Referring to the drawings, the present invention will now be described in detail with reference to the disclosed embodiments.

Figure 2:
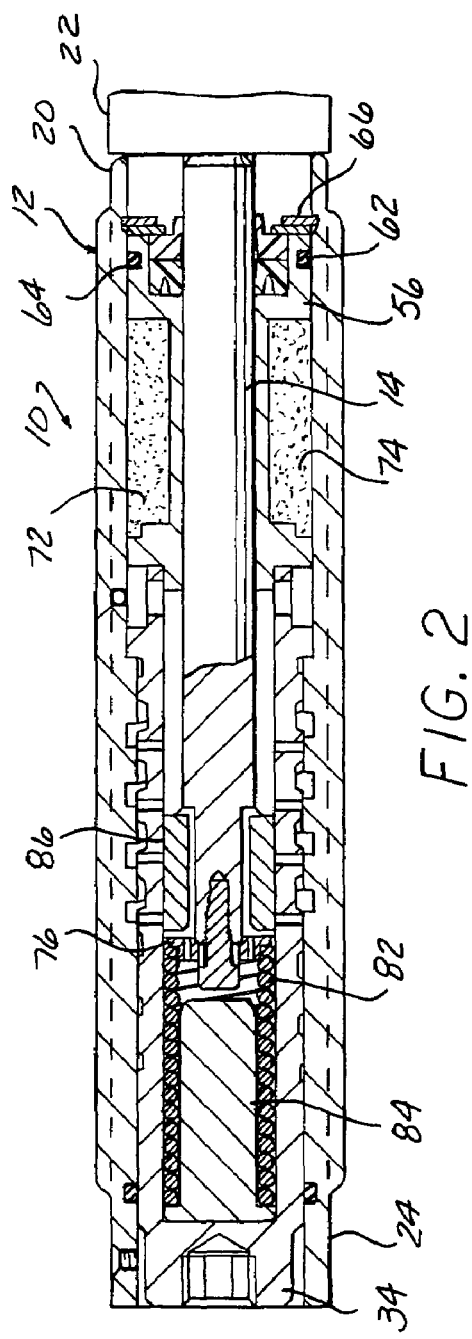
FIG. 2 is a sectional view showing the adjustable shock absorber of the present invention in the compressed position.
Figure 3:
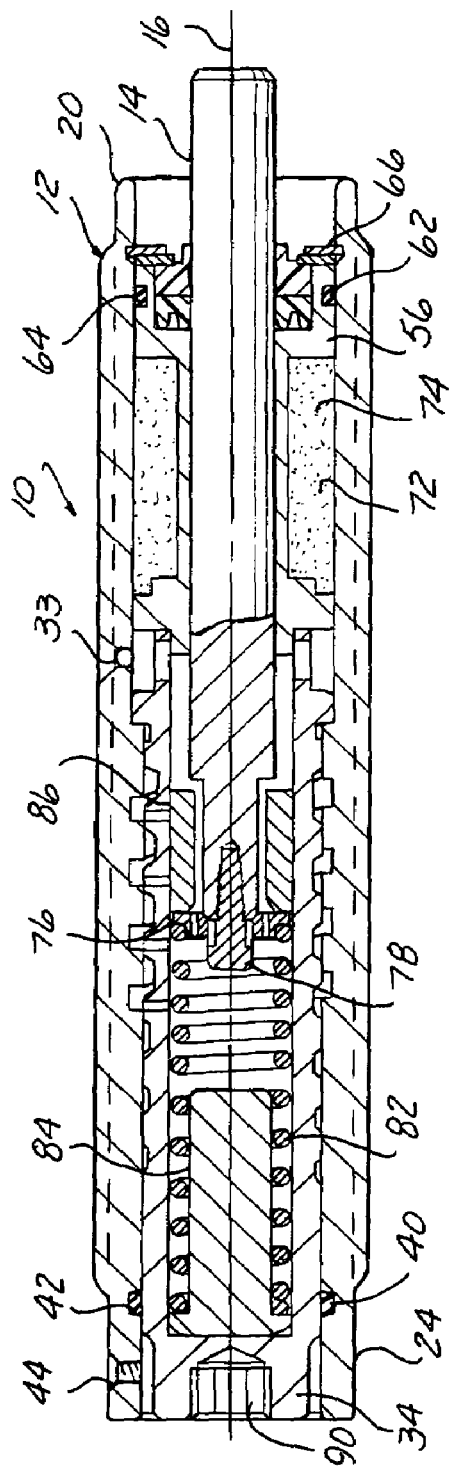
FIG. 3 is a sectional view showing the adjustable shock absorber of the present invention moving from the compressed position to the extended position.
Figure 5:
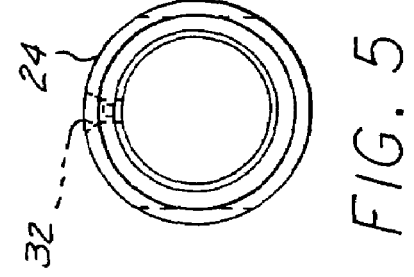
FIG. 5 is an end view of the outer tube of the adjustable shock absorber of the present invention.
Figure 4:
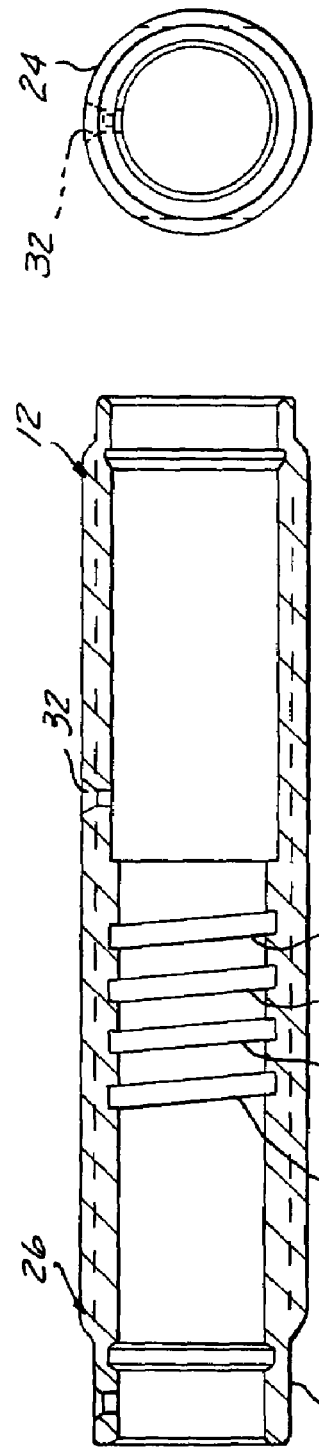
FIG. 4 is a sectional view of the outer tube of the adjustable shock absorber of the present invention.
Figure 6:
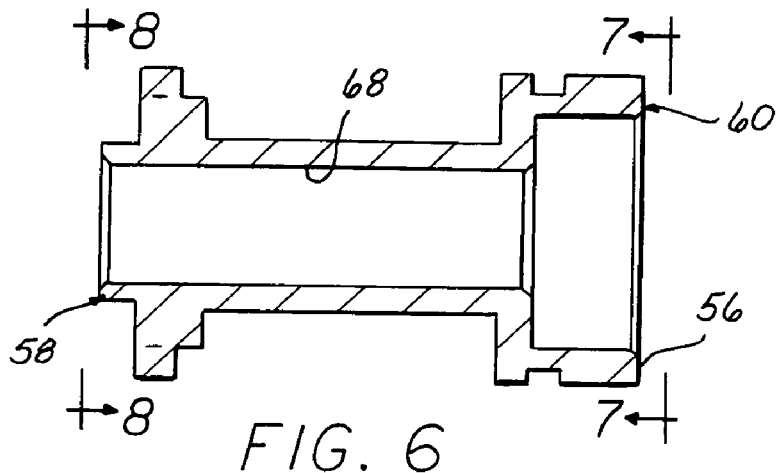
FIG. 6 is a sectional view of the bearing member of the adjustable shock absorber of the present invention.
Figure 8:
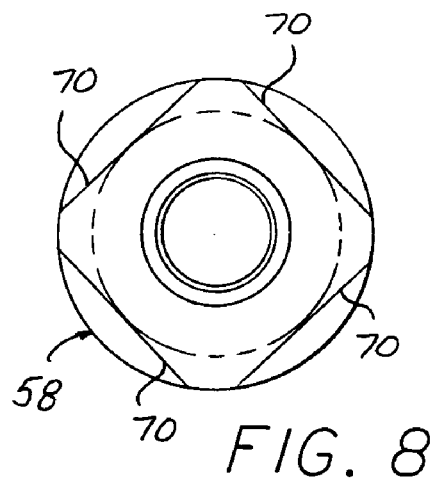
FIG. 8 is a sectional view taken in the direction of arrows 8—8 of FIG. 6 showing an end view of the bearing member of the adjustable shock absorber of the present invention.
Figure 7:
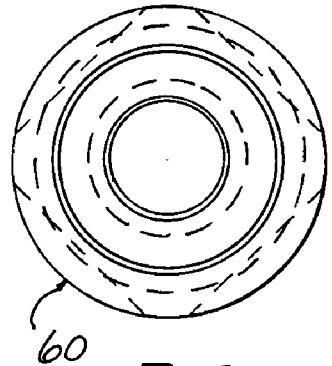
FIG. 7 is a sectional view taken in the direction of arrows 7—7 in FIG. 6 showing an end view of the bearing member of the adjustable shock absorber of the present invention.
Figure 9:
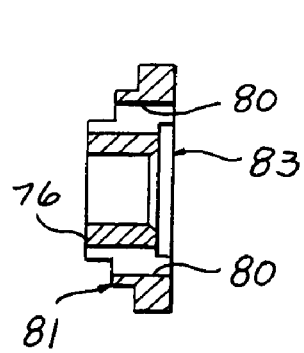
FIG. 9 is a sectional view of the piston head retainer of the adjustable shock absorber of the present invention.
Figure 10:
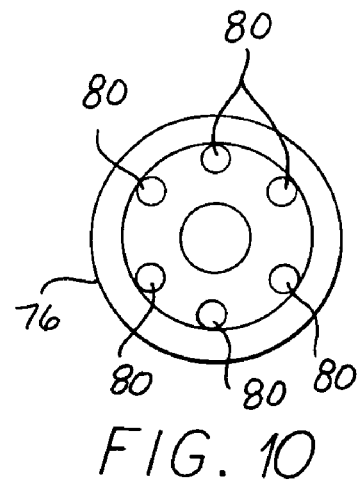
FIG. 10 is an end view of the piston head retainer of the adjustable shock absorber of the present invention.
Figure 11:
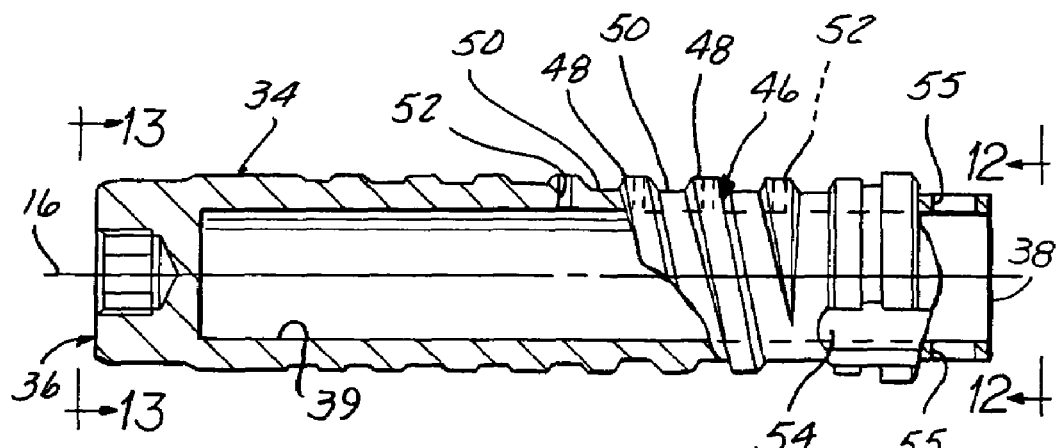
FIG. 11 is a partially sectioned plan view showing the inner tube of the adjustable shock absorber of the present invention.
Figure 12:
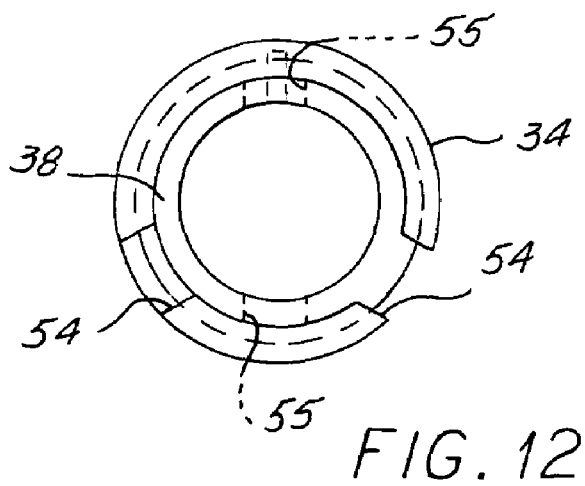
FIG. 12 is a sectional view taken in the direction of arrows 12—12 of FIG. 11 showing an end view of the inner tube of the adjustable shock absorber of the present invention.
Figure 13:
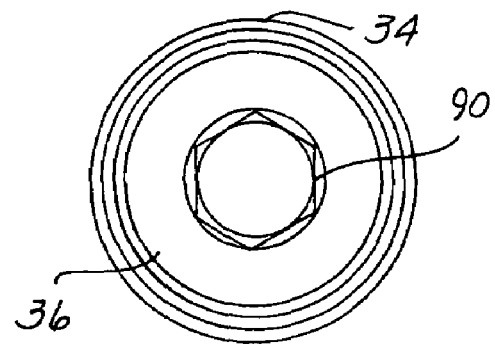
FIG. 13 is a sectional view taken in the direction of arrows 13—13 of FIG. 11 showing an end view of the inner tube of the adjustable shock absorber of the present invention.

FIGS. 1–3 depict an adjustable shock absorber 10 of the present invention. The adjustable shock absorber 10 provides an enclosed housing 12 having a fluid or oil disposed therein. A piston rod 14 is slidably received along a longitudinal axis 16 of the housing 12. One end 18 of the piston rod 14 extends beyond a forward end 20 of the housing 12, wherein the end 18 of the piston rod 14 engages a movable member 22. The adjustable shock absorber 10 is designed to slow the moving member 22 when moving from an extended position, wherein the piston rod 14 extends furthest outward from the forward end 20 of the housing 12, as seen in FIG. 1, to a compressed or retracted position, wherein the piston rod 14 is completely withdrawn within the housing 12, as seen in FIG. 2.

The housing 12 may include a substantially cylindrical outer tube 24 formed of a suitable ferrous material and having a rearward portion 26 and a forward portion 28. As seen in FIGS. 1–5, the rearward portion 26 includes a plurality of longitudinally spaced circumferentially extending interior grooves 30 formed on the inner periphery of the outer tube 24. The grooves 30 extend completely around the inner circumference of the outer tube 24 to form a complete circular groove in each case. A fill port 32 is provided in the forward portion 28 of the outer tube 24 to replenish oil drained or loss from inside the shock absorber 10. The fill port 32 may be plugged with a ball bearing 33 or some other conventional method of plugging or sealing.

In order to adjust the level of force applied against the moving member 22, an inner tube 34 is rotatably disposed within the outer tube 24. The inner tube 34 is formed of a suitable ferrous material and has a substantially cylindrical configuration, as seen in FIGS. 1–3 and 11–13. The inner tube 34 has a closed rearward end 36 and an open forward end 38 wherein a blind bore 39 extends almost the entire length of the inner tube 34. The outer periphery of the inner tube 34 is sealed to the inner periphery of the outer tube 24 by an O-ring seal 40 housed within an arcuate recess 42 provided within the inner periphery of the outer tube 24. A set screw 44 threadingly engages a threaded aperture provided in the outer tube 24, wherein the set screw 44 is accessible from outside the housing 12. The set screw 44 allows for rotational adjustment of the inner tube 34 relative to the outer tube 24 by disengaging the inner tube 34 and allowing for rotation of the inner tube 34 relative to the outer tube 24. In the alternative, the set screw 44 may engage the inner tube 34 to prohibit the rotation of the inner tube 34 relative to the outer tube 24. A hexagonal aperture 90 is also formed in the closed rearward end 36 of the inner tube 34 and is accessible from outside the housing 12 to rotatively adjust the inner tube 34 relating to the outer tube 24, as will be described in detail later.

The inner tube 34 is further defined by having a screw thread 46 formed on the outer surface or periphery of the inner tube 34. The screw thread 46 has male portions 48, which extend radially outward from the longitudinal axis 16 of the inner tube 34, and female portions 50, which extends radially inward toward the longitudinal axis 16 of the inner tube 34. Four through apertures 52 extend through four male portions 48 of the screw thread 46 and into the bore 39 extending within the inner tube 34. The apertures 52 and male and female portions 48, 50 of the inner tube 34, correspondently align with the interior grooves 30 formed in the inner periphery of the outer tube 24. As will be described in detail later, this alignment allows for the adjustable communication of fluid flow between and through the inner and outer tubes 34, 24. Two flats 54 are also formed in the inner tube 34 to provide fluid communication from the screw thread 46. The two flats 54 are formed on the outer periphery of the inner tube 34 toward the forward end 38 of the inner tube 34. A pair of through apertures 55 are provided in the forward end 38 of the inner tube 34 to direct oil from the flats 54 to inside the inner tube 34.

In order to slidably support the piston rod 14 within the housing 12, a bearing member 56 is fixedly disposed within the forward portion 28 of the outer tube 24, as seen in FIGS. 1–3 and 6–8. The bearing member 56 is formed of a suitable ferrous material and has a generally substantially cylindrical configuration with a plurality of step diameters. A rearward end 58 of the bearing member 56 has a stepped diameter such that the outer diameter of the bearing member 56 cooperatively engages a portion of the inner diameter of the inner tube 34, while the end of the inner tube 34 may abut the end of the bearing member 56. A forward end 60 of the bearing member 56 has its outer perimeter sealed to the inner diameter of the outer tube 24 by an O-ring 62 that is seated within a groove 64 recessed in the outer diameter of the bearing member 56. The inner perimeter of the forward end 60 of the bearing member 56 is sealed against the piston rod 14 by a U-cup seal 63 and a wiper 65. A washer 67 abuts the wiper 65 and the forward end 60 of the bearing member 56. A snap ring 66 secures the washer 67 against the wiper 65 and is seated within a groove provided in the inner diameter of the outer tube 24 to secure the bearing member 56 within the housing 12. The bearing member 56 also has a through bore 68 along its longitudinal axis for receiving the piston rod 14.

To provide for the passage of oil between the forward end and the rearward end of the housing 12, the bearing member 56 provides four flats 70 provided on the outer periphery of the rearward end 58 of the bearing member 56. These flats 70 allow for communication of oil from the rearward portion 26 of the outer tube 24 to the forward portion 28 of the outer tube 24. The flats 70 on the bearing member 56 also communicate oil to an oil storage compartment 72 that is created by a reduced or stepped outer diameter of the bearing member 56, thereby creating the oil storage compartment 72 between the reduced diameter of the bearing member 56 and the inner diameter of the outer tube 24. The reduced diameter extends along a central portion of the bearing member 56. A close cell sponge 74 is disposed within the oil storage compartment 72 of the bearing member 56.

To slow the moving member 22, the piston rod 14 is slidably received by the through bore 68 provided in the bearing member 56, as seen in FIGS. 1–3. The piston rod 14 is a substantially cylindrical member having a stepped diameter at the rearward end of the piston rod 14. A piston head retainer 76 is connected to the rearward end of the piston rod 14 by a threaded fastener 78. The piston head retainer 76 is a substantially cylindrical member having six apertures 80 extending therethrough, as seen in FIGS. 1–3 and 9–10. The apertures 80 allow for the flow of oil through the piston head retainer 76. A rearward end of the piston head retainer 76 has a stepped diameter for receiving an end of a coil spring 82 housed within the rearward end 36 of the inner tube 34. A spring retainer 84 is also disposed within the rearward end 36 of the inner tube 34. The spring retainer 84 is substantially cylindrical and extends upward within the coil spring 82 to support the coil spring 82 during compression and to maintain the shape of the coil spring 82.

In order to redirect the flow of oil between the extended position and the compressed position, a substantially cylindrical piston 86 circumscribes the rearward end of the piston rod 14, as seen in FIGS. 1–3. The piston 86 has an outer diameter that slidably engages the inner diameter of the inner tube 34 and an inner diameter that is slightly larger than the outer diameter of the rearward end of the piston rod 14. The space between the inner diameter of the piston 86 and the outer diameter of the piston rod 14 allows oil to flow between the piston 86 and the piston rod 14. The piston 86 is captured by the forward end 83 of the piston head retainer 76 and a shoulder 88 created by the stepped diameter on the rearward end of the piston rod 14. The distance between the forward end of the piston head retainer 76 and the shoulder 88 of the piston rod 14 is slightly longer than the length of the piston 86 such that the piston 86 may move to engage either the forward end of the piston head retainer 76 or the shoulder 88 of the piston rod 14. Specifically, when the piston rod 14 is moving toward the compressed position, the forward end of the piston 86 engages the shoulder 88 of the piston rod 14. When the piston rod 14 is moving toward the extended position, the rearward end of the piston 86 engages the forward portion of the piston head retainer 76. This movement of the piston 86 allows for the redirection of oil between the compressed position and the extended position, as will be described in detail later.

In operation, the shock absorber 10 may begin its cycle in the extended position, as seen in FIG. 1. In the extended position, the interior bore 39 of the inner tube 34 is filled with oil, and the coil spring 82 within the inner tube 34 biases the piston rod 14 toward the extended position. As the moving member 22 applies force to the piston rod 14 toward the compressed position, the piston 86 engages the shoulder 88 of the piston rod 14. Oil is forced through the apertures 52 in the inner tube 34 to the interior grooves 30 formed in the inner diameter of the outer tube 24. The oil then travels to the screw thread 46 formed in the outer diameter of the inner tube 34, wherein oil communicates through the flats 54 provided in the outer diameter of the inner tube 34 toward the forward end of the inner tube 34. The oil travels across the flats 70 provided in the bearing member 56, wherein the oil is stored in the oil storage compartment 72 and compresses the close cell sponge 74. The piston rod 14 continues to travel toward the compressed position until the moving member 22 abuts the forward end 20 of the housing 12, as seen in FIG. 2.

When the piston rod 14 begins to move back to the extended position, the piston 86 remains idle until the forward portion of the piston head retainer 76 abuts the rearward portion of the piston 86, as seen in FIG. 3. When this occurs, oil is allowed to flow from the forward portion of the housing 12 to the rearward portion of the housing 12 by passing between piston 86 and piston rod 14 and through the apertures 80 provided in the piston head retainer 76. The close cell sponge 74 in the oil storage compartment 72 creates a fluid pressure as a result of the sponge 74 being compressed by the oil. Thus, as the piston rod 14 begins to move toward the extended position, the oil pressure created in the oil storage compartment 72 forces the oil toward the rearward portion of the inner tube 34. The coil spring 82 also works to bias the piston rod 14 toward the extended position. Once the piston rod 14 reaches the extended position, the cycle is complete and may begin again.

To adjust the resistive force applied to the moving member 22 by the piston rod 14, the inner tube 34 may be rotated relative to the outer tube 24 in order to adjust the size of the fluid flow openings provided by the apertures 52 in the inner tube 34, the interior grooves 30 in the inner periphery of the outer tube 24, and the female portion 50 of the screw thread 46 in the inner tube 34. The inner tube 34 provides a hexagonal aperture 90 in the rearward end of the inner tube 34 that is exposed to the exterior of the housing 12 so that a user may engage the hexagonal aperture 90 with an allen wrench or equivalent tool. The set screw 44 may be loosened to allow for the rotation of the inner tube 34 relative to the outer tube 24. The user may then engage the hexagonal aperture 90 with an alien wrench to rotate the inner tube 34 a maximum of 180°. The resistance to movement of the piston rod 14 along the longitudinal axis 16 will extend in a range from the least to the most resistive force in a 180° turn of the inner tube 34. The resistive force applied to the moving member 22 will decrease as the fluid flow openings increase and will increase as the fluid flow openings decrease.

It should be noted that the screw thread 46 of the inner tube 34 is manufactured on a centerless grinding machine after the inner tube 34 has been hardened. The screw thread 46 of the inner tube allows for the passage of oil along the helical path of the female portion 50 of the screw thread 46 as opposed to the conventional use of milled flats on a cylinder by which to communicate oil. The grinding of the screw thread 46 on the inner tube 34 is a more efficient process of manufacturing, as it does not require a two-step process of grinding and milling, and it does not create burrs, such as milling, which may affect the performance of the shock absorber 10.

While the invention has been described in connection with what is presently considered to be the most practical and preferred embodiment, it is to be understood that the invention is not to be limited to the disclosed embodiments, but on the contrary, it is intended to cover various modifi-

What is claimed is:

1. An adjustable shock absorber for applying a force to a moving member so as to decelerate the member comprising:
   an outer tube having a substantially cylindrical configuration and a plurality of substantially circular, angular grooves formed in an inner surface of said outer tube;
   an inner, substantially cylindrical tube rotatably disposed within said outer tube, and said inner tube having a closed rearward end and an open forward end;
   a piston rod having a rearward end slidably disposed within said inner tube and a forward end extending outward from said forward end of said inner tube and engageable with said member, and said piston rod movable between a compressed position, wherein said piston rod is furthest toward said rearward end of said inner tube, and an extended position, wherein said piston rod is furthest toward said forward end of said inner tube;
   said inner tube having a plurality of apertures extending therethrough and fluidly communicatable with said grooves in said outer tube;
   a screw thread formed in an outer surface of said inner tube, and said screw thread fluidly communicatable with said grooves in said outer tube; and
   said inner tube and said outer tube rotatable with respect to each other to adjust the level of fluid communication between a rearward end and a forward end of said shock absorber by adjusting the flow of fluid between said apertures of said inner tube and said grooves of said outer tube and between said grooves of said outer tube and said screw thread of said inner tube to adjust the force applied to said moving member.

2. The adjustable shock absorber stated in claim 1, further comprising:
   said piston rod having a rearward end slidably disposed within said inner tube and a forward end extending outward from said forward end of said shock absorber; and
   a piston head circumscribing said rearward end of said piston rod wherein a gap exists between said piston rod and said piston head, and said piston head movable between said compressed position, wherein fluid flow is prohibited from passing between said piston head and said piston rod, and said extended position, wherein said fluid flow is open between said piston head and said piston rod.

3. The adjustable shock absorber stated in claim 2, further comprising:
   a piston head retainer connected to said rearward end of said piston rod and having at least one aperture extending therethrough;
   a shoulder formed on said piston rod, and said piston head captured by said piston head retainer and said shoulder on said piston rod;
   said piston head abutting said shoulder in said compressed position to prohibit fluid flow between said piston head and said piston rod and abutting said piston head retainer in said extended position to allow fluid flow between said piston head and said piston rod and through said aperture in said piston head retainer.

4. The adjustable shock absorber stated in claim 1, further comprising:
   said screw thread having a male portion and a female portion; and
   said apertures and said inner tube located on said male portion of said screw thread on said outer diameter of said inner tube.

5. The adjustable shock absorber stated in claim 4, further comprising:
   said male portion of said screw thread slidingly engaging said inner diameter of said outer tube.

6. The adjustable shock absorber stated in claim 1, further comprising:
   a passageway in said forward end of said inner tube and in communication with said screw thread for further communicating fluid flow between said rearward end and said forward end of said shock absorber.

7. The adjustable shock absorber stated in claim 1, further comprising:
   the force applied to said moving member being adjustable between a maximum force and a minimum force in response to 180° of relative rotation between said outer tube and said inner tube.

8. The adjustable shock absorber stated in claim 1, further comprising:
   said through apertures in said inner tube corresponding in number to said grooves in said outer tube.

9. An improved shock absorber having an inner tube having a rearward end and a forward end wherein said inner tube is closed at the rearward end and open at the forward end, a piston rod slidably received in the inner tube and projecting out of the open forward end of the inner tube for impact by a moving object, an outer tube surrounding the inner tube, a cushioning fluid substantially filling the shock absorber, an adjustable fluid flow path for directing said cushioning fluid between a rearward end and a forward end of said shock absorber, wherein the size of said fluid flow path may be adjusted to selectively vary the impact resistance generated by the movement of said cushioning fluid to said fluid flow path in response to impacting movement of the piston rod toward the closed rearward end of the inner tube, the improvement comprising:
   a plurality of apertures extending through said inner tube to communicate said cushioning fluid between an inner portion of said inner tube and said forward end of said shock absorber;
   a plurality of substantially circular, angular grooves formed in the inner diameter of said outer tube and communicatable with said apertures;
   a screw thread formed on the outside diameter of said inner tube, and said screw thread communicatable with said grooves in said outer tube; and
   said inner tube and said outer tube rotatable with respect to one another to adjust the level of communication between said apertures of said inner tube and said grooves of said outer tube and between said grooves of said outer tube and said screw thread in said inner tube to adjust the level of flow of said cushioning fluid between said rearward end and said forward end of said shock absorber in response to said impacting movement of said piston.

10. The improved shock absorber stated in claim 9, further comprising:
    said screw thread having a male portion and a female portion; and
    said apertures in said inner tube located on said male portion of said screw thread on said outer diameter of said inner tube.

11. The improved shock absorber stated in claim 10, further comprising:
said male portion of said screw thread slidingly engaging said inner diameter of said outer tube.

12. The improved shock absorber stated in claim 9, further comprising:
a passageway in said forward end of said inner tube and in communication with said screw thread for further communicating said cushioning fluid between the rearward end and the forward end of said shock absorber.

13. The improved shock absorber stated in claim 9, further comprising:
said piston rod having a rearward end slidably disposed within said inner tube and a forward end extending outward from said forward end of said shock absorber; and
a piston head slidably coupled to said rearward end of said piston rod for movement between a compressed position, wherein said piston rod slides toward the rearward end of said shock absorber thereby directing said cushioning fluid toward a rearward end of said piston head toward said apertures in said inner tube, and an extended position, wherein said piston rod slides toward the forward end of said shock absorber thereby directing said cushioning fluid to flow from said forward end to said rearward end of said shock absorber between said piston head and said piston rod.

14. The improved shock absorber stated in claim 9, further comprising:
said level of force applied to said moving member is adjustable between a maximum force and a minimum force in response to 180° of relative rotation between said outer tube and said inner tube.

15. The improved adjustable shock absorber stated in claim 9, further comprising:
said through apertures in said inner tube corresponding in number to said grooves in said outer tube.

16. An adjustable shock absorber, comprising:
an outer, substantially cylindrical tube having a rearward end and a forward end;
an inner, substantially cylindrical tube rotatably disposed within said rearward end of said outer tube;
a piston rod having a rearward end slidably disposed within said inner tube and a forward end slidably disposed within said forward end of said outer tube wherein said forward end of said piston rod is engageable with a moving member;
an outer periphery of said inner tube and an inner periphery of said outer tube having complementary engaging surfaces that combine to provide a passageway between said outer tube and said inner tube for allowing fluid to flow axially along said passageway between said rearward end and said forward end of said outer tube;
said inner tube having a plurality of apertures extending therethrough and communicatable with said passageway wherein all of said apertures are equally spaced axially along said inner tube wherein said fluid flows axially forward of said apertures through said passageway; and
said inner tube and said outer tube rotatable with respect to one another to adjust the level of fluid communication between said rearward end and said forward end of said outer tube by adjusting the flow of fluid between said apertures of said inner tube and said passageway for adjusting the level of force applied to said moving member.

17. The adjustable shock absorber stated in claim 16, further comprising:
at least one of said inner periphery of said outer tube and said outer periphery of said inner tube having at least one recess formed therein.

18. The adjustable shock absorber stated in claim 17, wherein said at least one recess further comprises:
at least one substantially circular groove formed therein.

19. The adjustable shock absorber stated in claim 17, wherein said at least one recess further comprises:
a screw thread formed therein.

20. The adjustable shock absorber stated in claim 16, further comprising:
a fluid storage compartment disposed within said forward end of said outer tube and in fluid communication with said passageway.

21. An adjustable shock absorber for applying a force to a moving member, comprising:
an outer tube having an inner surface with at least one first recess formed therein;
an inner tube rotatably disposed within said outer tube and having at least one second recess formed in an outer surface of said inner tube, wherein said at least one second recess is substantially helical, and said inner tube having at least one aperture;
said outer tube receiving said inner tube and said first recess of said outer tube complementarily engaging said second recess of said inner tube to define a passageway for allowing fluid to flow axially along said passageway between said outer tube and said inner tube forward of said at least one aperture;
a piston rod having a rearward end slidably disposed inside said inner tube and a forward end disposed outside said outer tube;
said at least one aperture and said at least one first and second recess cooperate to define at least one fluid flow opening; and
said inner tube is rotatable with respect to said outer tube to vary the size of said at least one fluid flow opening.

22. The adjustable shock absorber of claim 21 wherein said at least one second recess is a screw thread.

23. The adjustable shock absorber of claim 21 wherein said shock absorber further comprises:
said piston rod engageable with a moving member to apply a force to said moving member wherein said force has a maximum value when said size of said at least one fluid flow opening has a minimum value and said force has a minimum value when said size of said at least one fluid flow opening has a maximum value.

* * * * *